US005553022A

United States Patent [19]
Weng et al.

[11] Patent Number: 5,553,022
[45] Date of Patent: Sep. 3, 1996

[54] INTEGRATED CIRCUIT IDENTIFICATION APPARATUS AND METHOD

[75] Inventors: Kenneth C. Weng; Chia S. Weng, both of Austin, Tex.

[73] Assignee: Motorola Inc., Schaumburg, Ill.

[21] Appl. No.: 364,584

[22] Filed: Dec. 27, 1994

[51] Int. Cl.$^6$ ................................. G11C 7/00
[52] U.S. Cl. .................. 365/189.01; 365/94; 365/96
[58] Field of Search ................... 365/94, 96, 189.01

[56] References Cited

U.S. PATENT DOCUMENTS 5,299,151  3/1994  Ishihara et al. ........................ 365/96
5,325,323  6/1994  Nizaka ................................... 365/96

Primary Examiner—David C. Nelms
Assistant Examiner—F. Niranjan

[57] ABSTRACT

An integrated circuit identification device (10) includes a plurality of inverters (12–16), a first bus (24), an address bus (26), a plurality of drivers (18–22), a pre-charge circuit (28) and an identification code access (30). Each inverter (12) includes a P-channel FET (32–36) and an N-channel FET (38). An identification code is written to the device (10) by selectively breaking down the gate-well dielectric layer (112) of the N-channel FET which permanently alters the FET. When the address bus provides a read signal to the gate drivers, each N-channel FET that has been altered will be unable to turn on, thus the precharging of the P-channel FET keeps the output of the inverter at a logic "1". N-channel FETs that have not be altered will be on when the read signal is provided, thus providing a logic "0".

16 Claims, 4 Drawing Sheets

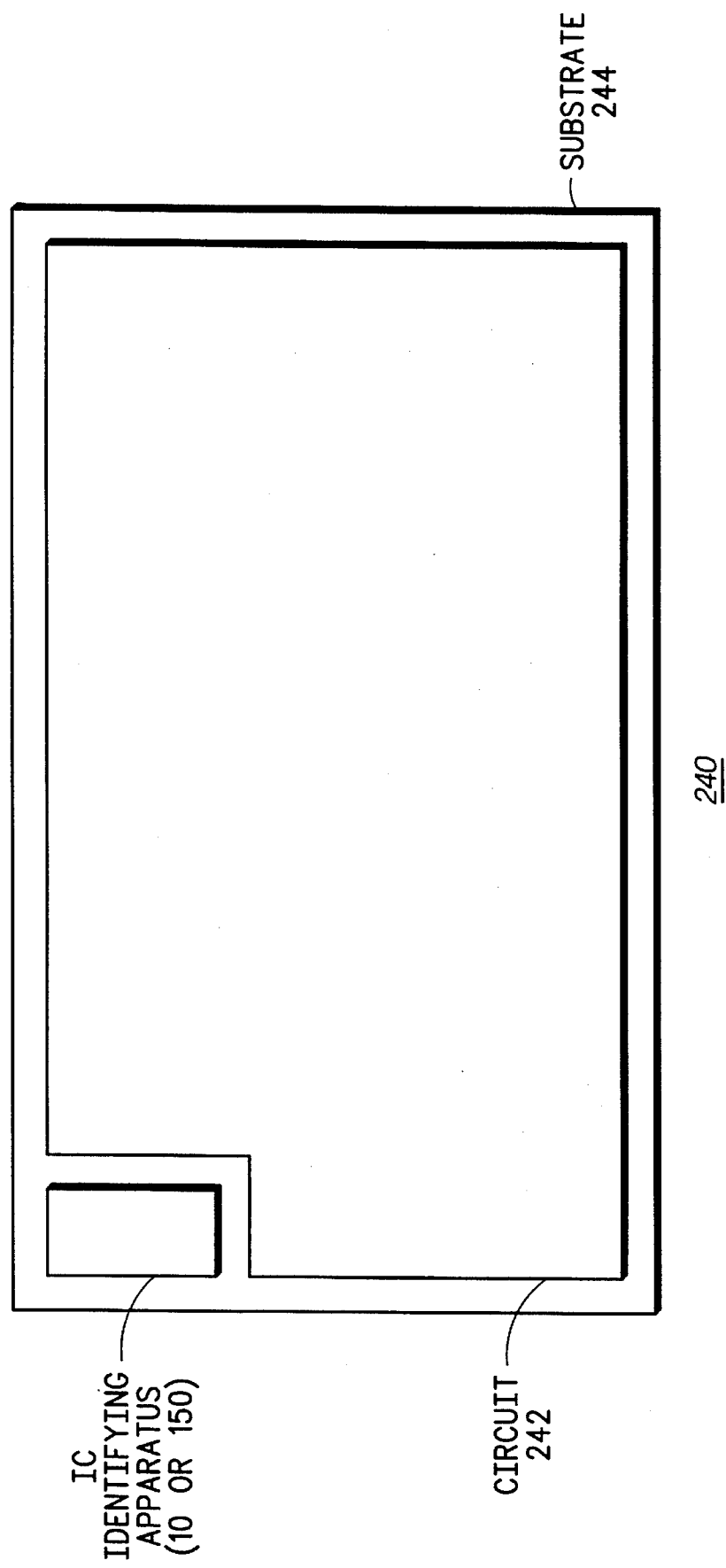

INTEGRATED CIRCUIT IDENTIFICATION APPARATUS AND METHOD

FIELD OF THE INVENTION

The present invention relates generally to integrated circuits and more specifically to an identification apparatus and method for uniquely identify an integrated circuit.

BACKGROUND OF THE INVENTION

Integrated circuits ("ICs") have evolved greatly over the years. When first introduced, ICs contained only a few circuit elements. Presently, a complex IC may include millions of circuit elements. Thus, ICs have become increasingly complex and valuable over the years. Because of the value of the ICs, theft in the industry has increased greatly and a black market has developed in which stolen parts are trafficked. Because individual identification of parts helps to curb theft of the ICs, techniques for individually identifying ICs have been developed.

Previous techniques for identifying ICs to prevent theft included labeling the IC package. Unfortunately, the labeling could be easily removed and provided only minimal protection. Labeling the substrates of the ICs, while providing a more suitable means for identification, required numerous mask sets for functionally equivalent parts and was too expensive to justify the benefit.

Prevention of theft, however, is not the only reason to individually identify ICs. In many applications, ICs must be electrically identified so that they are uniquely addressable. Cellular telephone systems, for example, require that each individual phone on the system responds only to signals directed to it. Thus, in a typical cellular phone system, an IC in each cellular phone is programmed with a unique identification code so that the phone is electrically identified. Based on this identification code, the cellular telephone system accesses the phone individually by including the phone's identification code in a transmitted signal. The phone recognizes the identification code, enables signal receipt circuitry, and then receives the signal. Because each phone on the cellular system has a unique identification code, the cellular telephone system may address each phone separately by selectively transmitting identification codes.

Identification devices commonly used to identify ICs employ non-volatile memory chips such as electronically programmable read-only-memory (EPROM) and electronically erasable programmable read-only-memory (EEPROM) chips, these chips being written with a unique identification code. Because these components provide non-volatile memory, once the identification code is written into them, it remains indefinitely and may be read from the memory chips as needed to use in a decoding function. The identification code may also serve to identify the individual IC if stolen.

EPROMs and EEPROMs do have limitations, however. In certain environmental conditions, their memory contents may be inadvertently destroyed. Also, because they may be written more than once, the contents may be intentionally altered if stolen. Once rewritten, the identification code is lost. Thus, EPROMs and EEPROMs provide little protection to prevent theft and only adequate performance in addressing functions.

Therefore, a need exists for an integrated circuit identification apparatus and method that is non-volatile, that may not be altered once it has been programmed, and that is inexpensive to implement.

BRIEF DESCRIPTION OF THE DRAWINGS

FIG. 5 illustrates a block diagram of an integrated circuit incorporating the integrated circuit identification apparatus in accordance with the present invention.

DETAILED DESCRIPTION OF THE DRAWINGS

Generally, the present invention provides an apparatus and method for individually identifying integrated circuitry. The invention allows identical ICs to be programmed with unique identification codes that may not be altered, destroyed, or overwritten. The invention incorporates identical identification circuitry within each IC so that only a single mask set is required and that no external labeling is required. Once programmed, each IC may be identified simply by accessing its identification code.

Figure 1:
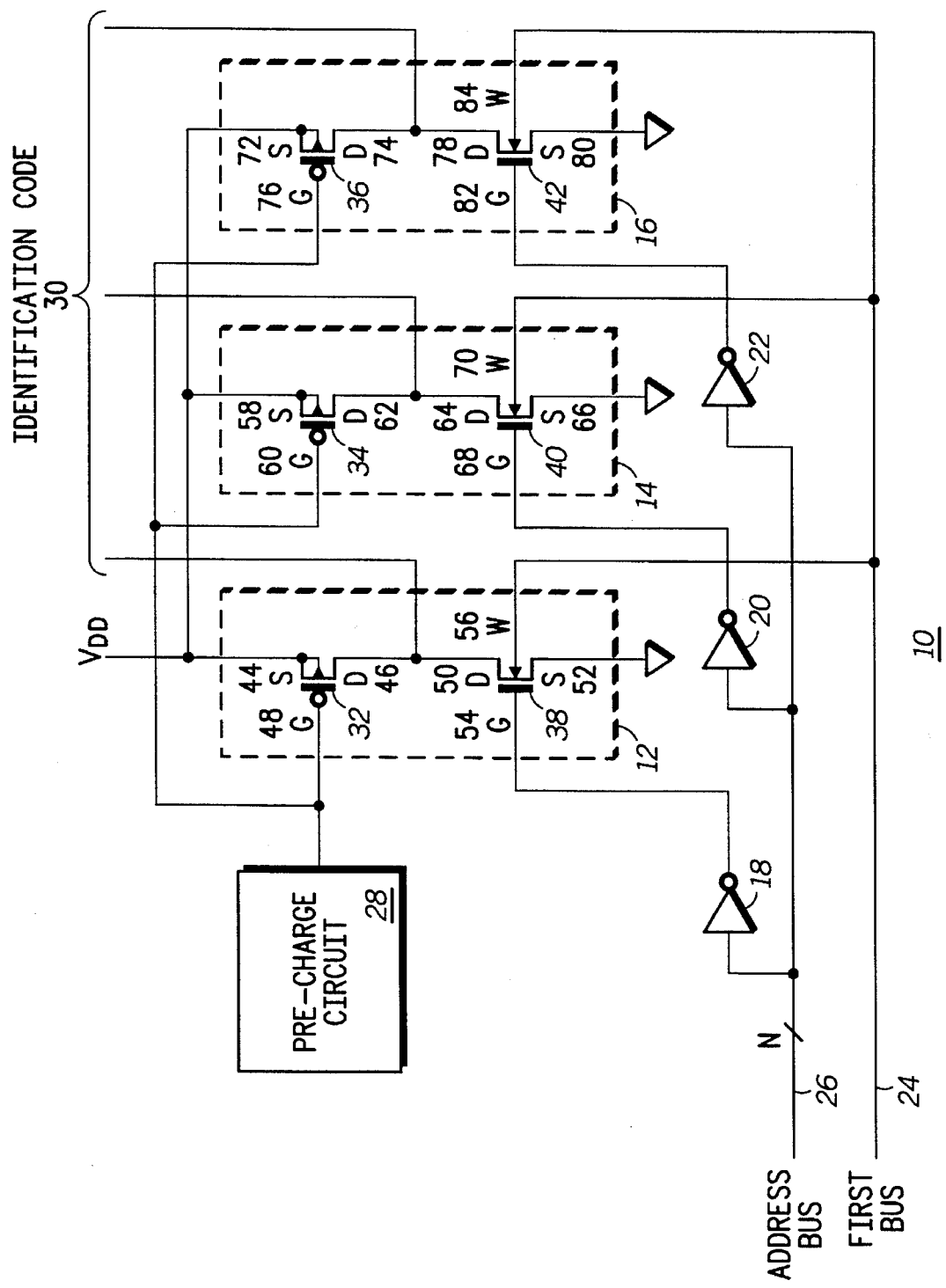
FIG. 1 illustrates a schematic block diagram of a first embodiment of an integrated circuit identification apparatus in accordance with the present invention.

FIG. 1 illustrates a schematic block diagram of a first embodiment of an integrated circuit identification apparatus 10 in accordance with the present invention. Generally, the apparatus 10 comprises a plurality of inverters 12, 14, and 16, a plurality of gate drivers 18, 20, and 22, a first bus 24, and an address bus 26, the elements serving to write an identification code. The apparatus 10 also preferably includes a pre-charge circuit 28 and an identification code bus 30 that may be used to read the identification code that has been written.

In the embodiment of FIG. 1, the plurality of inverters 12, 14, and 16 comprise a first inverter 12, a second inverter 14, and a third inverter 16. The first inverter 12 comprises a P-channel FET 32 and an N-channel FET 38. The P-channel FET 32 of the first inverter 12 includes a source node 44, a drain node 46, and a gate node 48. The N-channel FET 38 of the first inverter 12 includes a drain node 50 connected to the drain node 46 of the P-channel FET 32, a source node 52, a gate node 54, and a well node 56. The second inverter 14 comprises a P-channel FET 34 and an N-channel FET 40. The P-channel FET 34 of the second inverter 14 includes a source node 58, a drain node 62, and a gate node 60. The N-channel FET 40 of the second inverter 14 includes a drain node 64 connected to the drain node 62 of the P-channel FET 34, a source node 66, a gate node 68, and a well node 70. The third inverter 16 comprises a P-channel FET 36 and an N-channel FET 42. The P-channel FET 36 of the third inverter 16 includes a source node 72, a drain node 74, and a gate node 76. The N-channel FET 42 of the third inverter 16 includes a drain node 78 connected to the drain node 74 of the P-channel FET 36, a source node 80, a gate node 82, and a well node 84.

The sources 52, 66, and 80 of the N-channel FETs 38, 40, and 42 are tied to a reference ground. The sources 44, 58, and 72 of the P-channel FETs 32, 34, and 36 are tied to a reference voltage $V_{DD}$. Thus, the inverters 12, 14, and 16 are permanently biased.

Each of the plurality of gate drivers 18, 20, and 22, which are inverting drivers in the particular embodiment of FIG. 1, is coupled to a gate node 54, 68, 82 of the N-channel FETs 38, 40, 42 of a corresponding one of the plurality of inverters 12, 14 and 16. Specifically, a first gate driver 18 output drives the gate node 54 of the N-channel FET 38 of the first inverter 12. A second gate driver 20 drives the gate node 68 of the N-channel FET 40 of the second inverter 14. Finally, a third gate driver 22 drives the gate node 82 of the N-channel FET 42 of the third inverter 16.

The first bus 24 operably couples to the well nodes 56, 70, 84 of each of the N-channel FETs 38, 40, 42 of the plurality of inverters 12, 14, and 16. In the first preferred embodiment of the present invention, the first bus 24 comprises a single line that addresses each of the well nodes 56, 70, and 84 of the N-channel FETs 38, 40, and 42 simultaneously. However, as one skilled in the art will readily appreciate, the first bus 24 could be configured such that it may individually address the well node 56 of the N-channel FET 38 of the first inverter 12, the well node 70 of the N-channel FET 40 of the second inverter 14, and the well node 84 of the N-channel FET 42 of the third inverter 16.

The address bus 26 operably couples to each of the plurality of gate drivers 18, 20, and 22 such that each gate driver may be individually activated. In this fashion, either a high or low signal may be provided to each of the gate nodes 54, 68, and 82 of the N-channel FETs 38, 40, and 42. Because the gate drivers 18, 20, and 22 are inverting gate drivers, a high signal on the address bus 26 produces a low signal at the corresponding gate node and vice versa.

During an alter cycle, the address bus 26 and the first bus 24 selectively write an identification code to the IC identification apparatus 10 such that at least one of the plurality of inverters 12, 14, and 16 is permanently altered. For example, assume that the first inverter 12 and the third inverter 16 are to be permanently altered. In this situation, address bus 26 would provide a first, or alteration, signal, logic high, to the first driver 18 and the third driver 22 thus driving the voltage at gate nodes 54 and 82 to zero. Simultaneously, the first bus 24 provides a second signal, preferably 7 to 10 volts, to all well nodes 56, 70, and 84 of the N-channel FETs 38, 40, and 42. In this condition, the gate-well voltage on N-channel FET 38 and N-channel FET 42 is large enough to break down the dielectric isolation layer. Thus, the first inverter 12 and the third inverter 16 are permanently altered. Preferably, after an identification code is written, the first bus 24 is permanently disconnected from the inverters 12, 14, and 16 so that the inverters may not again be altered.

Figure 2:
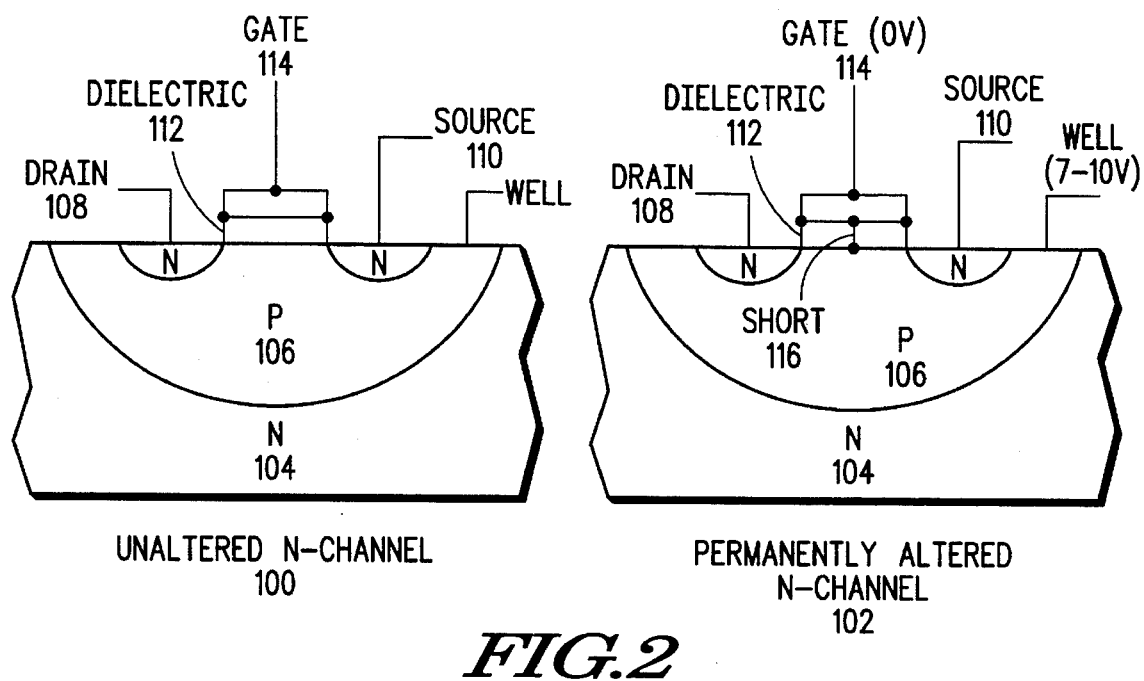
FIG. 2 illustrates sectional representations of unaltered and altered N-channel field effect transistors in accordance with the integrated circuit identification apparatus of the present invention.

Referring to FIG. 2, an unaltered N-channel FET 100 includes an N-doped substrate 104, a P-doped well 106, an N-doped drain 108, an N-doped source 110, and a gate 114 that is isolated from the well 106 by a dielectric layer 112. During normal operation, the application of a positive voltage to the gate 114 of the unaltered N-channel FET 100 creates an inversion layer between the source node 110 and the drain node 108 in the well 106, thus turning the FET 100 on. When an N-channel FET 110 has been permanently altered as described above and as shown in FIG. 2 by tying the gate 114 at 0 volts and applying between 7 and 10 volts to the well 106, a short 116 is created between the gate 114 and the well 106 through the dielectric layer 112. In a permanently altered N-channel FET 102, the gate-well isolation has been broken down and the application of a positive voltage to the gate 114 will not create an inversion layer. Thus, the permanently altered N-channel FET 102 may not be again turned on.

Referring again to FIG. 1, a read of the identification code of the integrated circuit identification apparatus 10 is described assuming that the first inverter 12 and the third inverter 16 have been permanently altered. A read cycle of the identification code of the apparatus 10 includes two states, the pre-charge state and the read state. During the pre-charge state, the pre-charge circuit 28 applies a ground reference voltage to the gates 48, 60, and 76 of the P-channel FETs 32, 34, and 36 thus turning on the FETs. Also during the pre-charge state, the gates 54, 68, and 82 of the N-channel FETs 38, 40, and 42 are forced to a logic low level so that the N-channel FETs are turned-off. In the pre-charge state, then, the drain nodes 50, 64, and 78 of the N-channel FETs 38, 40, and 42 are all pulled up to the voltage $V_{DD}$.

During the read state of the read cycle, the pre-charge circuit 28 turns the P-channel FETs 32, 34, and 36 off by forcing the voltage on the gates 48, 60, and 76 of the P-channel FETs 32, 34, and 36 to $V_{DD}$. Simultaneously, the address bus 26 applies a third signal, at a logic low level, to each of the drivers 18, 20, and 22 so that a logic high level signal is applied to the gates 54, 68, and 82 of the N-channel FETs 38, 40, and 42. Immediately thereafter, the identification code 30 is read. Since the drains 50 and 78 of the first 38 and third 42 N-channel FETs have been pre-charged to $V_{DD}$, the FETs cannot be turned on, and the FETs have a capacitance between their sources and drains, the voltage on the drains 50 and 78 of the FETs remains high during the read state of the read cycle and first representations, logic high signals, are read. Conversely, because the second N-channel FET 40 is unaltered, the application of a high voltage to its gate 68 turns the device on thereby pulling the voltage at the drain 64 down to the reference ground potential and a second representation, at a ground reference level, is read. Therefore, with the first N-channel FET 38 and the third N-channel FET 42 altered, the identification code will read (1,0,1). With such a technique, an IC includes a permanent identification code which cannot be altered, removed or erased as was the case with prior art IC identification techniques.

As one skilled in the art will readily appreciate, the teachings of the present invention can be applied wherein a large number of inverters are connected as shown. Thus, if M inverters are connected in the manner shown, $2^M$ unique identification codes may be written into the device 10.

Figure 3:
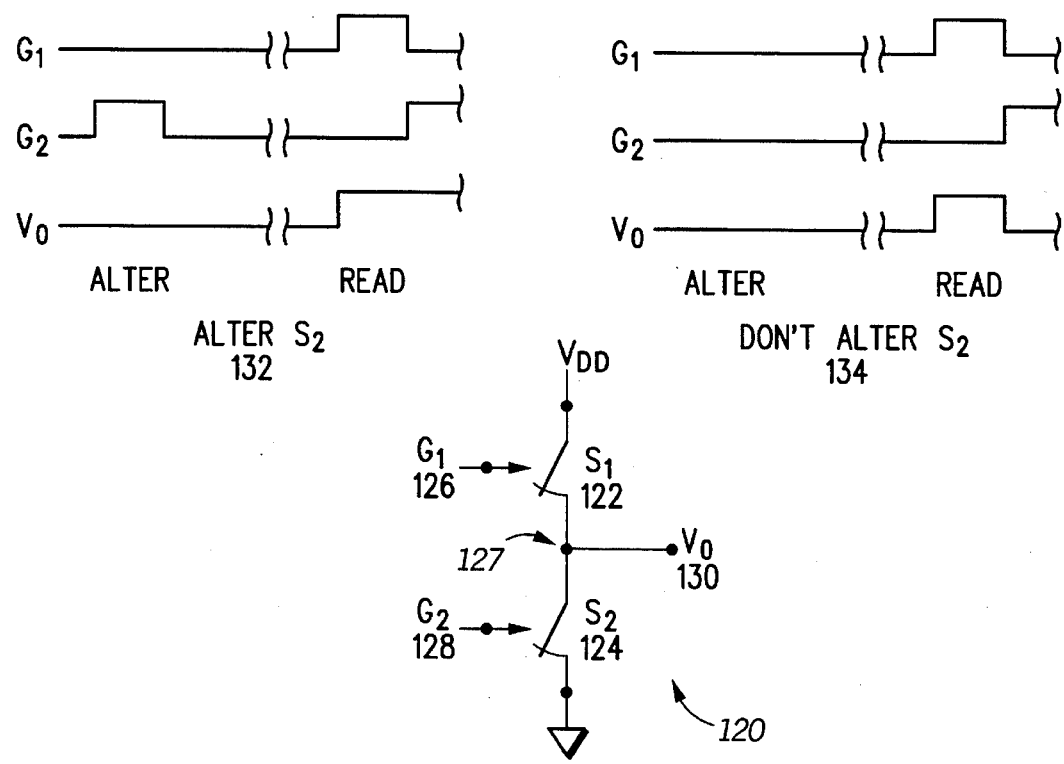
FIG. 3 illustrates a schematic block diagram of a second embodiment of an integrated circuit identification apparatus in accordance with the present invention.

FIG. 3 illustrates a schematic block diagram of a second embodiment of an integrated circuit identification apparatus 120 of the present invention. The apparatus 120 preferably comprises a first switch 122, a second switch 124, and a gating circuit 131. Preferably, the first switch includes a first node 123, a second node 125, and a gating node 126. The second switch 124 includes a first node 127 coupled to the second node 125 of the first switch 122, a second node 129, and a gating node 128. Preferably, the first node 123 of the first switch connects to reference voltage $V_{DD}$ and the second node 129 of the second switch 124 couples to a reference ground. As shown, the gating circuit 131 operably couples to the second switch 124, preferably at the gate 128, such that it may permanently alter the second switch 124. The gating circuit 131 also couples signals to the gate 126 of the first switch 122. An output voltage $V_O$ of the apparatus 120 is read at node 130.

Referring to the timing diagrams of FIG. 3, the alter $S_2$ sequence 132 includes applying a high voltage to the gate 128 of the second switch during the alter cycle at such a level that it permanently alters the switch 122. During an alter cycle of a don't alter $S_2$ sequence 134, no voltage is applied to the gate 128 of the second switch. Thus, on a read cycle following an alter cycle of an alter $S_2$ sequence 132, the first node 127 of the second switch is pre-charged during a pre-charge state to a logic high level by closing switch $S_1$ 122. Then, a gating signal is applied to the gate 128 of the second switch 124 in an attempt to close the switch. However, since the second switch 124 has been damaged, the voltage $V_O$, which is the same as the voltage on the first node 127 of the second switch 124, remains at a logic high level, and a 1 is read during the read state.

Alternatively, in a read cycle of the don't alter sequence $S_2$ 134, the first node 127 of the second switch is pre-charged during a pre-charge state to a logic high level by closing switch $S_1$ 122. Then, a gating signal is applied to the gate 128 of the second switch 124 in an attempt to close the switch. Because the second switch 124 has not been damaged, the voltage $V_O$, which is the same as the voltage on the first node 127 of the second switch 124, is brought down to the reference ground level, and a 0 is read during the read state.

Figure 4:
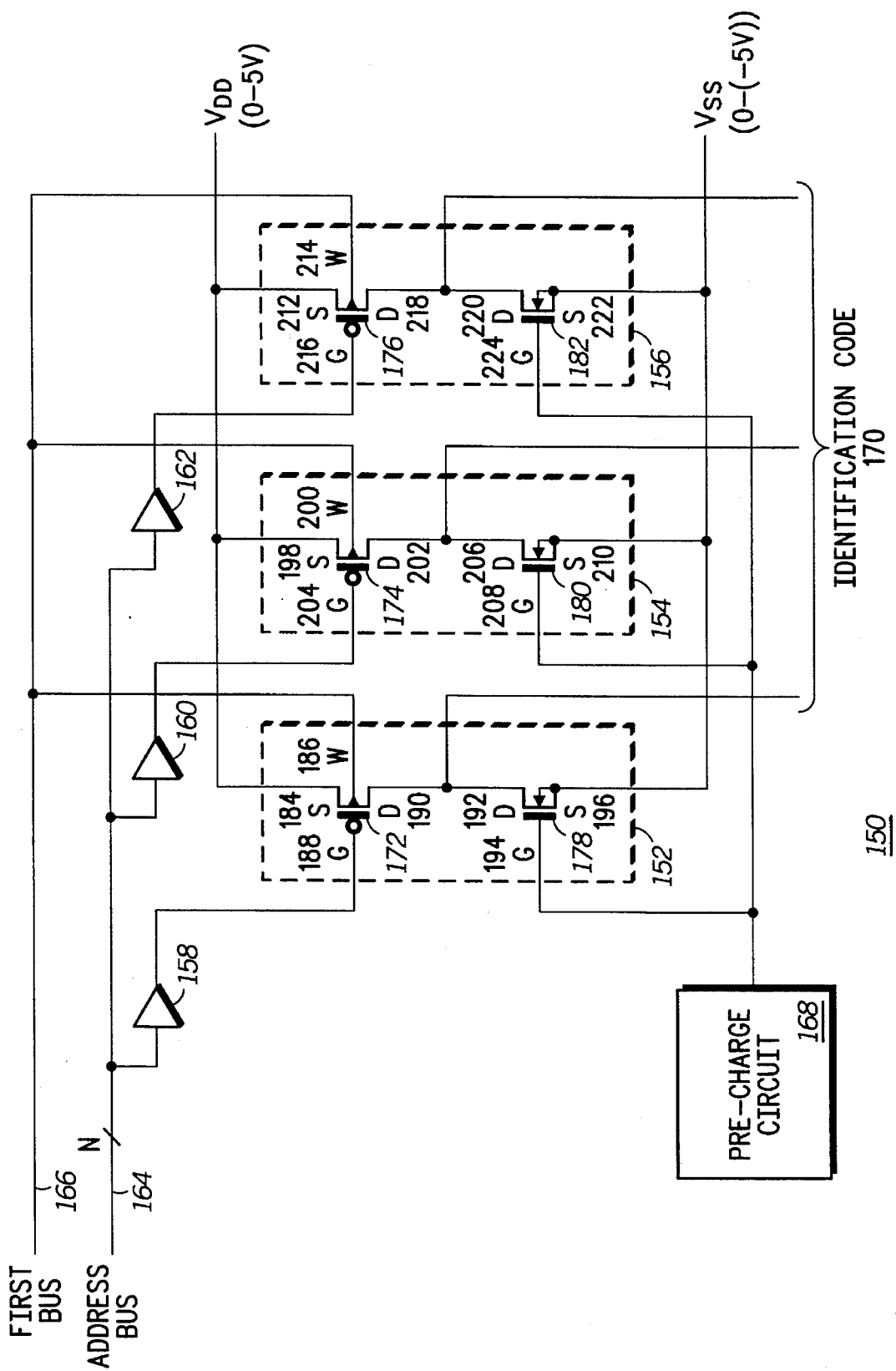
FIG. 4 illustrates a schematic block diagram of a third embodiment of an integrated circuit identification apparatus in accordance with the present invention.

Referring now to FIG. 4, a third embodiment of the integrated circuit identification apparatus 150 of the present invention is illustrated. Generally the apparatus 150 includes a plurality of inverters 152, 154, and 156, a plurality of gate drivers 158, 160, and 162, a first bus 166, and an address bus 164, the elements serving to write an identification code. The apparatus 150 also preferably includes a pre-charge circuit 168 and an identification code bus 170 that may be used to read the identification code that has been written.

The plurality of inverters 152, 154, and 156 comprise a first inverter 152, a second inverter 154, and a third inverter 156. The first inverter 152 comprises a P-channel FET 172 and an N-channel FET 178. The P-channel FET 172 of the first inverter 152 includes a source node 184, a well node 186, a gate node 188, and a drain node 190. The N-channel FET 178 of the first inverter 152 includes a drain node 192 connected to the drain node 190 of the P-channel FET 172, a gate node 194, and a source node 196 preferably tied to the substrate. The second inverter 154 comprises a P-channel FET 174 and an N-channel FET 180. The P-channel FET 174 of the second inverter 154 includes a source node 198, a well node 200, a drain node 202, and a gate node 204. The N-channel FET 180 of the second inverter 154 includes a drain node 206 connected to the drain node 202 of the P-channel FET 174, a gate node 208, and a source node 210. The third inverter 156 comprises a P-channel FET 176 and an N-channel FET 182. The P-channel FET 176 of the third inverter 156 includes a source node 212, a well node 214, a gate node 216, and a drain node 218. The N-channel FET 182 of the third inverter 182 includes a drain node 220 connected to the drain node 218 of the P-channel FET 176, a source node 222, and a gate node 224.

The sources 196, 210, and 222 of the N-channel FETs 178, 180, and 182 are tied to a reference ground level that ranges from 0 to minus 5 volts. The sources 184, 198, and 212 of the P-channel FETs 172, 174, and 176 are tied to a reference voltage $V_{DD}$ that ranges from 0 volts to 5 volts such that a bias voltage remains across the inverters 152, 154, and 156 permanently.

Each of the plurality of gate drivers 158, 160, and 162 is coupled to a gate node 188, 204, 216 of the P-channel FET 172, 174, 176 of a corresponding one of the plurality of inverters 152, 154 and 156. Specifically, a first gate driver 158 output drives the gate node 188 of the P-channel FET 172 of the first inverter 152. A second gate driver 160 drives the gate node 204 of the P-channel FET 174 of the second inverter 154. Finally, a third gate driver 162 drives the gate node 216 of the P-channel FET 176 of the third inverter 156.

The first bus 166 operably couples to the well node of each of the P-channel FETs 172, 174, 176 of the plurality of inverters 152, 154, and 156. In the third preferred embodiment of the present invention, the first bus 166 comprises a single line that addresses each of the well nodes 186, 200, and 214 of the P-channel FETs 172, 174, and 176 simultaneously. However, as one skilled in the art will readily appreciate, the first bus 166 could be configured such that it individually addresses the well node 186 of the P-channel FET 172 of the first inverter 152, the well node 200 of the P-channel FET 174 of the second inverter 154, and the well node 214 of the P-channel FET 176 of the third inverter 156.

The address bus 164 operably couples to each of the plurality of gate drivers 158, 160, and 162 such that each gate driver may be individually activated. In this fashion, either a high or low signal may be provided to each of the gate nodes 188, 204, and 216 of the P-channel FETs 172, 174, and 176.

During an alter cycle, the address bus 164 and the first bus 166 selectively write an identification code to the IC identification apparatus 150 such that at least one of the plurality of inverters 152, 154, and 156 is permanently altered. For example, assume that only the second inverter 154 is to be permanently altered. In this situation, address bus 164 would provide a first signal to the second driver 160 thus driving the voltage at gate node 204 to approximately 7 to 10 volts. Simultaneously, the first bus 166 provides a second signal, at a reference ground level of 0 volts, to all well nodes 186, 200, and 214 of the P-channel FETs 172, 174, and 176. In this condition, the gate-well voltage on P-channel FET 174 is large enough to break down the dielectric isolation layer thus permanently altering the FET 174. Preferably, after the apparatus 150 is initialized, the first bus 166 is permanently disconnected such that it may no longer be accessed and therefore no alteration of the identification code may be performed.

A read of the identification code of the integrated circuit identification apparatus 150 is described assuming that the second inverter 152 has been permanently altered. A read of the identification code of the apparatus 150 includes two states, the pre-charge state and the read state. During the pre-charge state, the pre-charge circuit 168 applies a turn-on voltage to the gates 194, 208, and 224 of the N-channel FETs 178, 180, and 182 thus turning on the FETs. Also during the pre-charge state, the gates 188, 204, and 216 of the P-channel FETs 172, 174, and 176 are allowed to float so that the P-channel FETs are turned-off. In the pre-charge state, then, the drain nodes 190, 202, and 218 of the P-channel FETs 172, 174, and 176 are all pulled to the voltage $V_{SS}$.

During the read state of the access cycle, the pre-charge circuit 168 turns the N-channel FETs off by pulling the voltage on gates 194, 208, and 224 of the N-channel FETs 178, 180, and 182 to $V_{SS}$. Simultaneously, the address bus 164 applies a third signal to each of the drivers 158, 160, and 162 such that a logic low level signal is applied to the gates 188, 204, and 216 of the P-channel FETs 172, 174, and 176. Immediately thereafter, the identification code 170 is read. Since the drain 202 of the second P-channel FET 174 has been pre-charged to $V_{SS}$, the P-channel FET 174 cannot be turned on, and the FET 174 has capacitance between its source and drain, the voltage on the drain 202 of the P-channel FET 174 remains low during the read state of the access cycle and a first representation, logic low signal, is read. Conversely, because the first P-channel FET 172 and the third P-channel FET 176 are unaltered, the application of a low voltage to their gates 188 and 216 turns the devices on thereby pulling the voltage at their drains 190 and 218 up to the reference potential $V_{DD}$ and a second representation, at a logic high reference potential, is read. Therefore, with the second P-channel FET 174 altered, the identification code will read (1,0,1).

FIG. 5 illustrates a block diagram of an integrated circuit 240 incorporating the integrated circuit identification apparatus (10 or 150) of the present invention. Preferably, the integrated circuit 240 comprises a substrate 244, a circuit 242 deposited on the substrate 244 and an integrated circuit identification apparatus (10 or 150). The integrated circuit identification apparatus (10 or 150) could comprise any of the three embodiments described above. Thus, the integrated circuit 240 would include circuitry that would both allow the integrated circuit 240 to be individually accessed as well as identified if stolen.

The present invention also includes a first preferred method for identifying an integrated circuit 240. A first step in the method includes providing a first plurality of switches on a substrate of the integrated circuit. A second step in the method includes coupling a second plurality of switches to the first plurality of switches, each of the first plurality of switches serially coupled to a corresponding one of the second plurality of switches. A next step includes applying a damaging potential to and damaging at least one of the plurality of second switches. A final step in the method includes preventing further application of the damaging potential to the second plurality of switches. In this fashion, the first preferred method of the present invention allows an integrated circuit to be uniquely identified.

A second preferred method of the present invention for identifying an integrated circuit includes as a first step providing a first switch on a substrate of an integrated circuit. A next step includes coupling a second switch to the first switch. A third step includes applying a damaging potential to and damaging the second switch. Thus, the second preferred method of the present invention also allows an integrated circuit to be uniquely identified.

The present invention provides a method and apparatus for a permanent IC identification code. This is accomplished by providing a plurality of P-channel/N-channel inverters and permanently altering at least one inverter by damaging its N-channel FET. Having damaged the N-channel FET, when a read of the plurality of inverts is instituted, the non-altered N-channel FETs will turn on, thus providing a logic "0", while the altered N-channel FETs will not rum on, thus providing a logic "1". With such a method and apparatus an integrated circuit can have a unique and permanent identification code that cannot be erased, removed, or altered as was possible with prior art identification techniques presented in the background section.

The above described preferred embodiments are intended to illustrate the principles of the invention, but not to limit the scope of the invention. Various other embodiments and modifications to these preferred embodiments may be made by those skilled in the art without departing from the scope of the following claims.

We claim:

1. An integrated circuit identification apparatus comprising:
   (a) a plurality of inverters, each inverter of the plurality of inverters including an N-channel field effect transistor and a P-channel field effect transistor, wherein the N-channel field effect transistor includes a gate node, a source node, a well node, and a drain node, and the P-channel field effect transistor includes a gate node, a source node, and a drain node, and wherein the drain node of the N-channel field effect transistor is coupled to the drain node of the P-channel field effect transistor;
   (b) a plurality of gate drivers, each of the plurality of gate drivers being coupled to the gate node of the N-channel field effect transistor of a corresponding one of the plurality of inverters;
   (c) a first bus operably coupled to the well node of the N-channel field effect transistor of each of the plurality of inverters; and
   (d) an address bus operably coupled to the plurality of gate drivers, wherein the address bus provides a first signal to at least one of the plurality of gate drivers while the first bus provides a second signal such that each inverter of the plurality of inverters that is coupled to a gate driver of the at least one of the plurality of gate drivers is permanently altered.

2. The apparatus of claim 1 wherein a third signal provided on the address bus causes the plurality of inverters to be read, each of the plurality of inverters that has been permanently altered provides a first representation and each of the plurality of inverters that has not been permanently altered provides a second representation.

3. The apparatus of claim 2 wherein:
   (a) the first signal produces a voltage level of approximately 0 volts at the gate node of the N-channel field effect transistor of the corresponding one of the plurality of inverters; and
   (b) the second signal produces a voltage level of at least 7 volts.

4. The apparatus of claim 3 wherein permanently altering the each inverter of the plurality of inverters that is coupled to a gate driver of the at least one of the plurality of gate drivers is achieved by breaking down a gate-well isolation of the N-channel field effect transistor.

5. The apparatus of claim 4, wherein the first representation and the second representation are produced by pre-charging the drain node of each of the P-channel field effect transistors of the plurality of inverters to a pre-charge level.

6. An integrated circuit identification apparatus comprising:
   (a) a first switch having a first node, a second node, and a gating node;
   (b) a second switch having a first node, a second node, and a gating node, wherein the first node of the second switch is coupled to the second node of the first switch; and
   (c) gating circuit operably coupled to the second switch, wherein the second switch is permanently altered when the gating circuit generates an alteration signal.

7. The apparatus of claim 6 wherein a third signal provided by the gating circuit causes the circuit identification apparatus to be read, the first node of the second switch providing a first representation when altered and a second representation when not altered.

8. The apparatus of claim 7, wherein the first and second representations are produced by pre-charging the second node of the first switch to a pre-charge level.

9. An integrated circuit identification apparatus comprising:
   (a) a plurality of inverters, each inverter of the plurality of inverters including an N-channel field effect transistor and a P-channel field effect transistor, wherein the N-channel field effect transistor includes a gate node, a source node, and a drain node, and the P-channel field effect transistor includes a gate node, a source node, a well node, and a drain node, and wherein the drain node of the N-channel field effect transistor is coupled to the drain of the P-channel field effect transistor;

(b) a plurality of gate drivers, each of the plurality of gate drivers being coupled to the gate node of the P-channel field effect transistor of a corresponding one of the plurality of inverters;

(c) a first bus operably coupled to the well node of the P-channel field effect transistor of each of the plurality of inverters; and an address bus operably coupled to the plurality of gate drivers, wherein the address bus provides a first signal to at least one of the plurality of gate drivers while the first bus provides a second signal such that each inverter of the plurality of inverters that is coupled to a gate driver of the at least one of the plurality of gate drivers is permanently altered.

10. The apparatus of claim 9 wherein a third signal provided on the address bus causes the plurality of inverters to be read, each of the plurality of gate drivers that has been permanently altered provides a first representation and each of the plurality of inverters that has not been permanently altered provides a second representation.

11. The apparatus of claim 10 wherein:

(a) the first signal produces a voltage level of at least 7 volts at the gate node of the P-channel field effect transistor of the corresponding one of the plurality of inverters; and (b) the second signal produces a voltage level of approximately 0 volts.

12. The apparatus of claim 11 wherein permanently altering the each inverter of the plurality of inverters that is coupled to a gate driver of the at least one of the plurality of gate drivers is achieved by breaking down a gate-well isolation of the P-channel field effect transistor.

13. The apparatus of claim 12, wherein the first and second representations are produced by pre-charging the drain node of each of the N-channel field effect transistors to a pre-charge level.

14. A method for identifying an integrated circuit, the method comprising the steps of:

(a) providing a first plurality of field effect transistors on a substrate of the integrated circuit;

(b) coupling a second plurality of field effect transistors to the first plurality of field effect transistors, each of the first plurality of field effect transistors serially coupled to a corresponding one of the second plurality of field effect transistors;

(c) applying a damaging potential to and damaging at least one of the second plurality of field effect transistors; and (d) preventing further application of the damaging potential to the second plurality of field effect transistors.

15. A method for identifying an integrated circuit, the method comprising the steps of:

(a) providing a first field effect transistor on a substrate of an integrated circuit;

(b) serially coupling a second field effect transistor to the first field effect transistor; and (c) applying a damaging potential to a gate of the second field effect transistor for damaging the second field effect transistor.

16. An integrated circuit comprising:

(a) a substrate;

(b) a circuit deposited on the substrate;

(c) a plurality of inverters deposited on the substrate, each inverter of the plurality of inverters including an N-channel field effect transistor and a P-channel field effect transistor, wherein the N-channel field effect transistor includes a gate node, a source node, a well node, and a drain node, and the P-channel field effect transistor includes a gate node, a source node, and a drain node, and wherein the drain node of the N-channel field effect transistor is coupled to the drain node of the P-channel field effect transistor;

(d) a plurality of gate drivers deposited on the substrate, each of the plurality of gate drivers being coupled to the gate node of the N-channel field effect transistor of a corresponding one of the plurality of inverters;

(e) a first bus deposited on the substrate and operably coupled to the well node of the N-channel field effect transistor of each of the plurality of inverters; and (f) an address bus deposited on the substrate and operably coupled to the plurality of gate drivers, wherein the address bus provides a first signal to at least one of the plurality of gate drivers while a second signal is provided on the first bus, each inverter that is coupled to a gate driver being provided with the first signal being permanently altered.

* * * * *